United States Patent [19]
Weaver

[11] Patent Number: 5,193,878
[45] Date of Patent: Mar. 16, 1993

[54] FOLDABLE VEHICLE PLATFORM

[76] Inventor: Michael N. Weaver, 371 Glen Rd., Hershey, Pa. 17033

[21] Appl. No.: 828,112

[22] Filed: Jan. 30, 1992

[51] Int. Cl.$^5$ .............................................. B60P 3/37
[52] U.S. Cl. ...................................... 296/162; 296/26
[58] Field of Search ........................ 296/162, 26, 61; 52/79.6

[56] References Cited

U.S. PATENT DOCUMENTS

| | | | |
|---|---|---|---|
| 2,405,878 | 8/1946 | Elwert | 296/61 X |
| 2,828,842 | 4/1958 | Plumley et al. | 52/79.6 X |
| 3,236,554 | 2/1966 | Cline | 296/26 |
| 3,352,440 | 11/1967 | Wilson | 296/61 X |
| 3,515,406 | 6/1970 | Endsley | 296/162 X |
| 3,796,456 | 3/1974 | Bergeson et al. | |
| 3,874,527 | 4/1975 | Royce | 296/61 X |
| 4,681,371 | 7/1987 | Leonard | 296/26 X |
| 4,854,631 | 8/1989 | Laurson | |
| 4,869,030 | 9/1989 | Clark | 296/162 X |
| 4,883,306 | 11/1989 | Stucky | 296/162 |

OTHER PUBLICATIONS

"Quick Patio", RV Business, Sep. 18, 1989, p. 54.

Primary Examiner—Charles A. Marmor
Assistant Examiner—Gary C. Hoge
Attorney, Agent, or Firm—Richard C. Litman

[57] ABSTRACT

A recreational vehicle is equipped with a portable platform which lies alongside the vehicle upon the ground in its deployed position and which is stowed beneath the vehicle during transport. The platform is moved between the stowed and the deployed position with a reversible motor. Manual deployment is possible in the event of absence of power for the motor. Energy storage means are used to reduce the required motor capacity. The platform may be made of multiple hinged elements suitable for unfolding on the ground in the deployed position and folding together in a stacked arrangement in the stowed position. A ramp is provided for wheelchair access to the platform.

15 Claims, 2 Drawing Sheets

FOLDABLE VEHICLE PLATFORM

FIELD OF THE INVENTION

Broadly, the present invention relates to the provision of general purpose attachments to vehicles in order to enhance their capabilities and usefulness. A stowable utility platform attachment is provided which may be incorporated in new vehicles or easily installed on existing vehicles. Once deployed the rigid platform may be put to a multitude of uses for both work and recreation. The platform or conversion kit of this invention may be adapted for use in any field in which it is desired to cover the terrain adjacent a vehicle with a flat rigid platform. As such it will be appreciated that the potential uses are myriad. A comprehensive listing of all the possible fields to which this invention might be applied is limited only by the imagination and thus will not be attempted here. Some of the more obvious applications are mentioned herein in the interest of providing a full and complete disclosure of the unique properties of this previously unknown general purpose article of manufacture.

More specifically, the preferred environment of the present invention is in the field of travel and outdoor recreation. The lure of outdoor environment is stronger than ever for residents of todays crowded pollution-choked cities. As a result, recreational vehicles in the form of self contained motorized units and towable camping trailer units have proliferated in recent years. Some recreational vehicles have evolved into virtual palaces on wheels costing upwards of $100,000. In spite of their high cost and luxuriousness these vehicles do not provide a convenient livable outdoor space as is provided by this invention. The user of such a vehicle wants to have the indoor accoutrements such as sleeping and bathing facilities but, at the same time, wants to enjoy the beautiful natural surroundings of the grand out-of-doors. Residents of permanent housing have long used patios and decks around their homes to indulge in outdoor pastimes such as having a picnic with charcoal grilled food or just sunbathing. This invention will provide mobile home users with easy access to the same pleasures by providing a convenient portable patio platform.

The invention also relates to the field of environmental preservation, more specifically to the reduction of trampling and otherwise damaging of virgin woodland plant life likely to be present in areas the platform is likely to be used.

It will become immediately evident that the unique properties of the apparatus herein disclosed will provide important benefits in many areas. Recreational vehicle utility is seen as the field most likely to gain immediate and substantial benefit from this invention. It is to be understood from the outset that the scope of the invention is not limited to this field or to the specific examples of potential uses presented hereinafter.

BACKGROUND OF THE INVENTION

In the past it has been necessary to park recreational vehicles in specially prepared areas (complete with concrete slabs, etc.) in order to fully enjoy the surrounding out door environment. This is particularly true just after a rain storm when any more remote area would likely be muddy and wet. Another problem with more remote areas is the presence of thorny plants such as thistles or noxious weeds such as poison ivy. However, most RV users would prefer to habitat a more remote area if it were accessible without getting thoroughly caked with mud or otherwise assaulted by mother nature. These factors tend to limit the usefulness of mobile recreational vehicles. As will be seen, this invention overcomes these disadvantages in a simple and cost effective manner.

DESCRIPTION OF THE PRIOR ART

It is known that public transportation vehicles, such as buses, are sometimes equipped with handicapped assistance devices that deploy a platform for lifting a wheelchair onto the bus. These lifts have much more stringent design requirements than the platform of this invention because of their radically different function. For example, the wheelchair lift must remain level during lifting, must not create any jerking motion, and must have guard rails surrounding their perimeter to protect the occupant during lifting. As a result these wheelchair lifts, although they utilize "deployable platforms", are vastly more complex and expensive than this invention. In addition, they tend to be highly unreliable. Generally, the structural details of these wheelchair lifts cannot even approach the simplicity of design possible with this invention.

The following U.S. Patents have been granted which strive for solution of the above mentioned problems or otherwise show some features similar to those of this invention:

Bergerson et al, U.S. Pat. No. 3,796,456, is considered the most pertinent prior art. Bergeson et al shows a recreational type vehicle with a manually extensible platform and step arrangement. The extended platform remains cantilevered high above the ground when in use, which means the steps are needed to access the platform from the ground. In contradistinction, the platform of the instant invention lies flush with and flat upon the ground when in use, thus eliminating the need for steps to access the platform from ground level and providing totally unrestricted access.

Larson, U.S. Pat. No. 4,854,631, shows dual platforms that form inclined vehicle loading ramps. These platforms do not lay flat on the ground when in use nor are they intended for human occupation.

None of the above prior art, taken singly or in combination, anticipates or makes obvious the invention claimed herein.

SUMMARY OF THE INVENTION

This invention provides apparatus, suitable for use as a conversion kit, for stowing and deploying a rigid platform from a vehicle or other mobile unit. In its stowed position the platform does not interfere with the operation of the vehicle in any way. in its deployed position the platform presents a clean flat base devoid of levers, linkages, gears, wheels, hand rails, steps, support columns, or other mechanical clutter. Simple but effective power means is provided for moving the platform between the stowed and deployed positions without manual effort. Energy storage means are provided to minimize the power required. The materials used for the components are generally conventional and chosen so as to provide reliable service and attractive appearance at minimum cost.

Accordingly, an object of the present invention is to provide a new and improved apparatus for stowing and deploying a platform in combination with a vehicle.

Another object is to provide apparatus as above wherein the planar bottom surface of the platform rests flat and flush upon the surrounding terrain when deployed.

Another object is to provide apparatus as above wherein the extension of the platform creates minimal damage to vegetation of the terrain upon which the platform is deployed.

Another object is to provide a new and improved apparatus for converting existing recreational vehicles having their own easily deployable patio or deck.

Another object is to provide the apparatus above such that it is fully power operated and capable of full deployment and stowage without manual intervention.

Another object is to provide the apparatus above with energy storage means during deployment such that the stored energy is returned to the system during stowage thus minimizing the power required.

Another object is to provide a power operated patio or deck as above which has no external protrusions or operating mechanism which will in any way interfere with the full use of and totally unrestricted access to the entire surface area of the deck in its deployed position.

Another object is to provide a clean accessible deck portion as above which is fitted with simple and effective means for providing handicapped (wheelchair) access to the platform in its deployed position.

Another object is to provide the apparatus above such that it may be inexpensively manufactured and sold in conversion kit form.

A general object is to provide improved elements and arrangements thereof in an apparatus for the purposes described which is inexpensive, dependable, and fully effective in accomplishing its intended purposes.

It is submitted that the present invention meets or exceeds all the above objects and goals. Upon further study of the specification and appended claims, further objects and advantages will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views and wherein.

DETAILED DESCRIPTION OF THE INVENTION

Figures 1, 2:
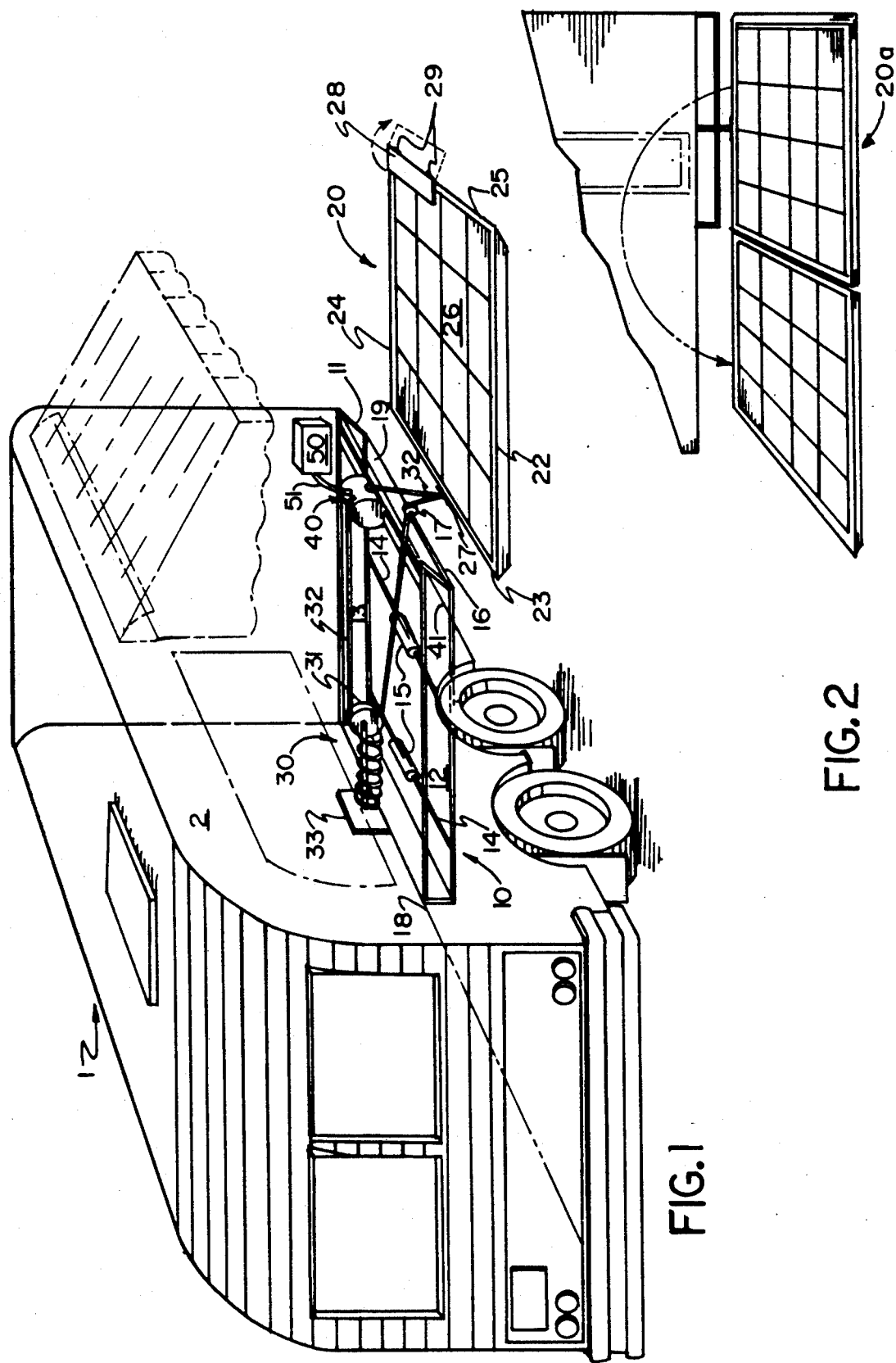
FIG. 1 is a perspective view from the rear of a recreational vehicle with portions shown as transparent so as to reveal the operating mechanism of an extensible platform which has been deployed therefrom.
FIG. 2 is a perspective view of a double-wide embodiment of the platform.
Figure 3A:
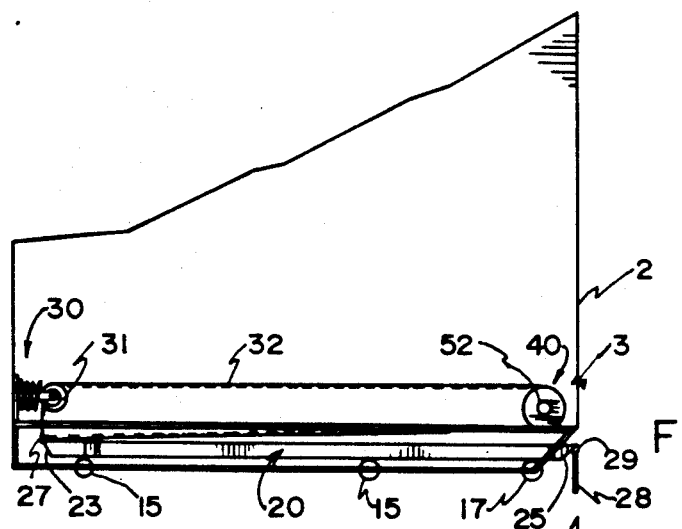
FIG. 3A is a schematic elevation view of the extensible platform in its stowed position.

The present invention is shown schematically in FIG. 1. A representative vehicle 1 is shown fitted with deployable platform 20. The vehicle, although shown as a towable trailer type camper, may be any form of motorized or towable form of wheeled or nonwheeled ground transport. The only requirement for the vehicle to use this invention is that there be sufficient width and ground clearance for the platform to be stowed underneath as more fully described later. In general the invention is envisioned as being easily attached to a wide range of existing commercial, utility, and recreational vehicles. Platform 20 is movable from a full deployed position wherein its substantially planar bottom surface rests flush upon the ground (as shown in FIGS. 1 and 3C) to fully stowed position where it is enclosed within storage bay 10 mounted beneath vehicle 1. As can be seen in FIG. 1, the fully deployed platform lies flush upon the ground adjacent said vehicle substantially outside the ground area covered by the vehicle. As clearly shown in the drawings, there are no upstanding hand rails or downward depending support feet mounted on platform 20 thus providing totally unrestricted manual ground level access to the platform from at least three sides when the platform is fully deployed. This also offers the easiest possible stowage in storage bay 10 as is hereinafter described.

Storage bay 10 includes side rails 12 and 13, spacer plate 18. Side rails 12 and 13 are mounted to the vehicle undercarriage so as to extend transversely across substantially the entire width of the vehicle and nearly parallel to one another. The side rails may be rigidly mounted to the vehicle undercarriage by any conventional means such as bolts, brackets, metal adhesives, welding, etc. The side rails 12 and 13 are preferably standard channel members opening toward one another. Spacer plate 18 is provided between the side rails at their left side as seen in FIG. 1 to reinforce and maintain them a fixed distance apart. A plurality of cross arms 14 extend between the lower portions of the side rails to maintain accurate spacing and provide further reinforcement. A further function of cross arms 14 is to provide support for rollers 15 described later. Cross plate 16 extends between the lower portions of the side rails at their right hand side as seen in FIG. 1 to maintain accurate spacing and provide further reinforcement. A further function of cross rod 16 is to provide support for cable guide 17 described later. The overall storage bay thus resembles a box closed on three sides by side rails 12 and 13 and spacer plate 18. The box is closed on its top side by the existing vehicle undercarriage and partially closed on its bottom side by cross arms 14 and cross rod 16. The remaining side of the box forms an insertion opening 19 suitable for receiving platform 20 within the confines of the boxlike storage bay 10. Side rails 12 and 13 are spaced just far enough apart so the channel opening in each wraps around respective edges 22 and 24 of platform 20 when the platform is inserted between them.

The distance between side rail 12 and side rail 13 may be slightly greater at the insertion opening end so as to provide for easier platform stowage. Additionally, the insertion opening ends of the side rails may be beveled and tapered as shown at 11 to guide platform 20 smoothly into the storage bay. Rollers 15 on cross arms 14 are provided to reduce friction during insertion of platform 20. Although only one roller 15 is shown on each cross arm 14 it will be recognized that a plurality of such rollers could be employed. Rollers 15 are designed to cooperate with the underside of platform 20 to assist in appropriate insertion and support the weight of the platform when stowed. Cable guide 17 rotatably mounted on cross rod 16 provides further support and guidance for the platform. To prevent the underside of platform 20 from rubbing against cable means 32 during extension or retraction the edge portions of cable guide 17 may be of a greater diameter than the cable means engaging portions of the cable guide. It should be understood that cable means 32 is shown as a thin cable for ease of illustration just as well be a wide thin band or flexible belt which is fully equivalent and perhaps even preferred for this apparatus. Thus, throughout this description the term "cable means" should be understood to also mean "belt" or "band". The exact configuration of storage bay 10 may vary depending upon the configuration of the undercarriage of the vehicle to which it is mounted. Generally, storage bay 10 is designed to present a generally rectangular insertion opening for easily receiving and stowing a flat platform parallel to the ground during vehicle transport and to allow for easy powered deployment of the platform from said storage bay to a position flush on the ground adjacent the vehicle.

Generally rectangular platform 20 has side edges 22 and 24 which fit inside the facing channel openings in side rails 12 and 13 as previously described. Side edges 22 and 24 can be tapered slightly along their length so as to correspond to any similar taper given to the side rails.

Lifting edge 23 is provided with attachment 27 for cable means 23 near the mid point of lifting edge 23. It will be recalled that the cable means 23 may be a wide belt or band in which case attachment 27 would be appropriately widened to match the width of the belt or band. One skilled in the art will recognize that the use a belt or band in place of a thin cable would tend to provide greater resistance to rotation of the platform about a vertical axis. This in turn would promote better alignment of the platform and tend to prevent jamming of the platform during insertion into the storage bay. If a user is willing to manually align the occasionally cocked platform the less expensive thin cable version will be preferred. If, on the other hand, smooth trouble free operation is desired the more expensive wide belt or band version will be preferred. Ground engaging edge 25 is beveled inwardly as it approaches the bottom side of platform 20 so as to form a skid surface for easier deployment of the platform to be described in the operation of the invention section. Likewise, lifting edge 23 is beveled inwardly as it approaches the bottom side of platform 20 so as to assist in the insertion operation more fully described later.

The top surface of platform 20 is covered with any durable and attractive material. Outdoor carpeting or decorative tiling are envisioned as just two of many possible alternatives. Generally, the overall platform may be constructed of any durable lightweight material of sufficient rigidity to maintain a flat surface while in flush contact with the ground during use. Aluminum, plastics, and treated wood products are among the many possibilities. The platform itself may be formed of one solid piece or constructed from light beams and panels, honeycomb structures, or the like.

Ramp 28 is foldably attached by hinges 29 to ground engaging edge 25 of platform 20. As seen in FIG. 1 ramp 28 may be unfolded from platform 20 to provide a smooth inclined surface leading from the ground to top surface 26 of platform 20. Although single ramp 28 is shown hinged to edge 25, it will be realized that similar ramps could be hinged to any or all edges to platform 20. Ramp 28 may be used to provide easy wheelchair access to the deployed platform, or to provide for easy dragging of a load from the ground onto the platform. For example a hunter may wish to drag a kill onto the platform for dressing out. Ramp 28 may be folded flush with top surface 26 of platform 20 before retraction of the platform. Alternately, ramp 28 may be left in its unfolded position during platform retraction. This would leave the ramp hanging from edge 25 when platform 20 is in its fully stowed position as shown in FIG. 3A. Then ramp 28 could be swung upwardly (as shown by the curved arrow in FIG. 3A) to be connected by conventional fastener means such as hook 3 on side 2 of vehicle 1. Thus ramp 18, in conjunction with hook 3, forms a simple but effective locking means for securing platform 20 in the storage bay during vehicle transport. Platform 20 may also be formed of multiple sections hinged together as shown in FIG. 2. In this embodiment the various platform sections would be folded so as to be stacked atop one another prior to stowage and unfolded for use after deployment. It will be obvious to one of ordinary skill that this fold and store principle may be extended to include three or more folding platform sections. With this in mind it can easily be seen that vastly divergent shapes and sizes of deployable platforms may be formed. For example, the folding sections may form a circular deck by unfolding in a manner similar to circular table tops. Also, it would be possible to interconnect the folding sections so as to unfold along a line to a relatively great length. Thus it would be possible to use this invention as a portable bridge.

Powered means are provided to effect the deployment and retraction of platform 20. The power means comprises spring loaded pulley mechanism 30, cable means 32, and reversible powered roller means 40. Spring loaded pulley mechanism, best shown in FIG. 3C, includes support plate 33 shown rigidly mounted atop spacer plate 18 on storage bay 10. It will be recognized that support plate 30 could be formed as an integral part of spacer plate 18 or that one or both could be a portion of the undercarriage of an existing vehicle. In any case support plate 33 serves to provide a connection point for the left ends of both tension spring 34 and telescopic member 35. Telescopic member 35 consists of several elements slidable within one another so as to provide a variable overall length. The individual elements may typically be lengths of hollow tubing. The right hand element 36 (remote from support plate 33) of telescopic member 35 is formed with a flange for connecting the right hand end of tension spring 34. Element 36 is also journalled at its outer end to provide rotational support for pulley 31. It will be noted that tension spring 34 has the net effect of shortening telescoping member 35 and drawing pulley 31 leftward.

Powered roller means 40 is rigidly mounted atop cross member 41 which extends between the upper portions of side rails 12 and 13 of storage bay 10. Powered roller means 40 has a conventional internal powered roller driven by a small reversible electric or hydraulic motor. The internal motor is connected to a control panel 50 through energy supply and control signal conduit 51. The internal motor drives the powered roller through a conventional internal clutch 52 (see FIG. 3A). The clutch 52 is arranged so as to permit roller to freewheel in the absence of electrical or hydraulic power in the energy supply conduit 51. This allows the platform to be manually deployed in the event of the absence of power. A unique feature of this invention is that it allows for a very small motor to be used as energy is mechanically stored for return to the system at the time power demands on the motor are the greatest. The powered roller means operates like a simple powered pulley commonly used in belt conveyors. In other words as a given length of cable or belt is reeled in on one side an equal length is paid out on the other.

Cable means 32 comprises a fixed length continuous loop of thin cable or wide belt or band. There is never any change in the total length of the cable means loop. A ridged belt may be used if it is determined that slippage is a problem. Cable means 32 loops down around pulley 31, downward to attachment 27 on platform edge 23, rightward and up around the internal powered roller of powered roller means 40, and back to the starting position above pulley 31.

OPERATION OF THE INVENTION

Figure 3B:
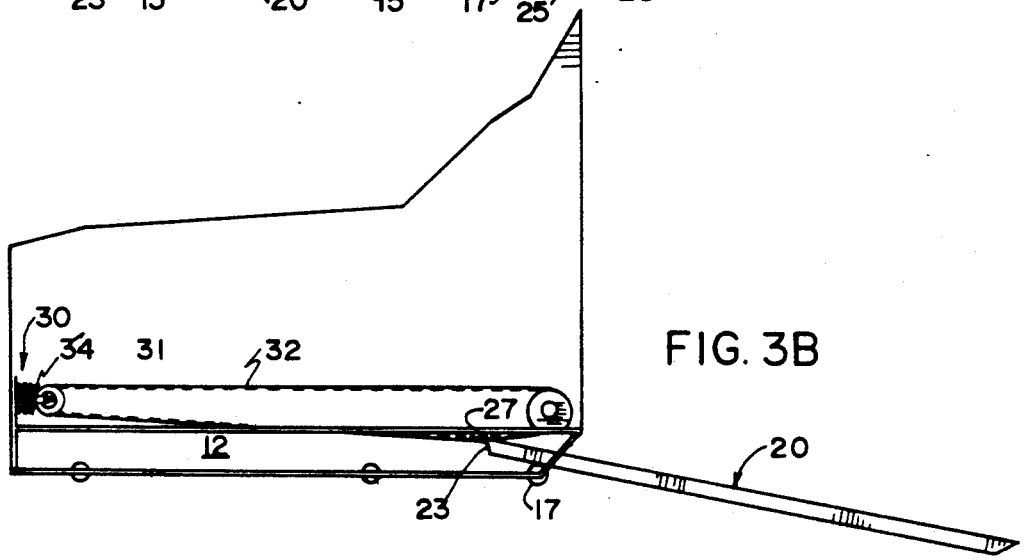
FIG. 3B is a schematic elevation view of the extensible platform in its partially deployed position.
Figure 3C:
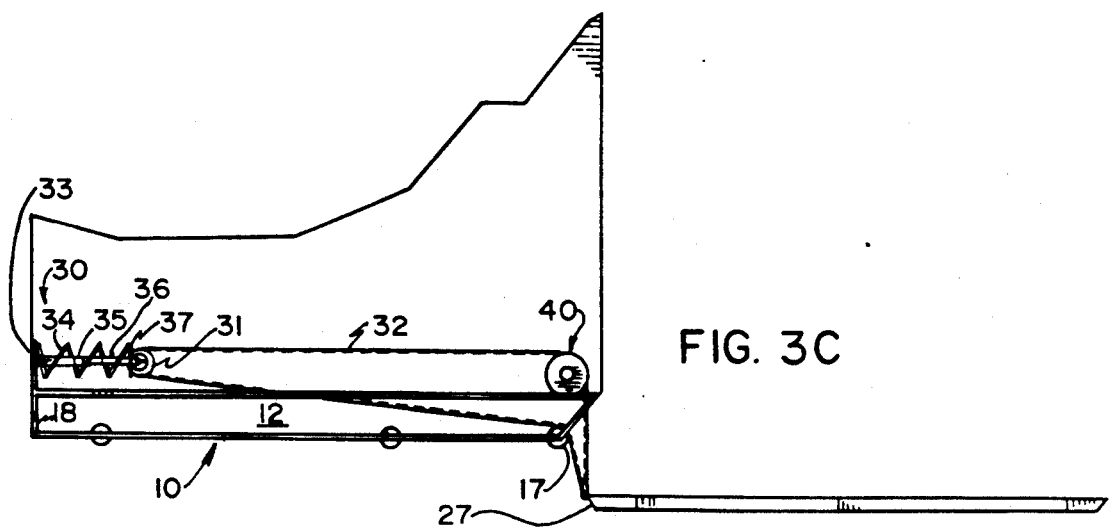
FIG. 3C is a schematic elevation view of the extensible platform in its fully deployed position lying flush upon the ground.

FIGS. 3A, 3B, and 3C show the platform in its stowed, partially deployed, and fully deployed positions respectively. An explanation of how the power means is operated to effect such deployment will now be given. Beginning from the stowed position in FIG. 3A it will be noted that the tension spring of spring mechanism 30 is slightly extended so as to provide a leftward urging of pulley 31 and a tension in cable means 32. Thus, as will be seen, cable means 32 is maintained in perpetual tension by spring mechanism 30. Powered roller means 40 is now operated so as to rotate the powered roller in the counter clockwise direction causing the lower strand of cable means 32 to move rightward and pulling platform 20 in the same direction because of the connection cable means 32 to the platform at attachment 27. This motion proceeds smoothly and easily because of the roller 15 and cable guide 17 supporting the entire weight of the platform.

When the above rightward motion has proceeded far enough the weight of platform 20 will cause it to begin to tilt downwardly to the right as shown in FIG. 3B. Near the limit of its rightward travel the downward tilt will be great enough to cause edge 25 of platform 20 to contact the ground. The level of outer edge 25 will be seen to promote sliding on the ground during the last few inches of the rightward movement. At this point it will be seen that about half the weight of the platform is supported by cable guide 17 and the other half by the ground.

Further rightward movement (past the position shown in FIG. 3B) will cause edge 23 of platform to move past cable guide 17. At this point it will be seen that about half the weight of the platform is supported by the short length of cable means 32 between the powered roller and attachment 27, and the other half by the ground.

At this point the direction of the powered roller is reversed (now clockwise) thus paying out the above mentioned short length of cable means 32 and allowing the edge 23 of the platform to begin to drop. As edge 23 begins to drop it will be noted that, since the overall length of the cable means loop is constant, pulley 31 is pulled to the right as edge 23 begins to drop. The strength of spring 34 is not sufficient to support the weight of the dropping platform so that it allows pulley 31 to be pulled rightward as the platform is lowered. The camming action of the bevel on edge 23 with cable guide 17 assures that the increasing tension in cable means 32 does not immediately drawn the platform back over guide 17 as it is lowered.

Further clockwise rotation of the powered roller will allow the platform to be further lowered till it lies substantially flat upon the ground as shown in FIG. 3C. It will be noticed that as the platform is further lowered spring 34 is further extended. The net effect of this action is to store the gravitational potential energy of the initially elevated platform as elastic energy in the spring. The spring should be adjusted so that platform 20 would remain level with the ground even if the ground support were completely removed from beneath the left hand side of the platform. The platform in its fully deployed position has nearly half its weight still supported by the tensioned cable means 32. This in return leads to substantially less ground pressure and resultant environmental damage.

Retraction of the platform is accomplished by substantially reversing the steps required for deployment. First the powered roller is rotated counter clockwise to begin raising the left hand side of the platform. Spring 34 assists in this lifting action by shortening during the raising. This spring assist action substantially reduces the power required of the electric or hydraulic motor. When attachment 27 has been elevated above cable guide 17 the powered roller direction is again reversed (now clockwise) so as to pull the platform into storage bay 10 by virtue of the leftward motion of the lower section of belt means 32. Here the camming action between the bevel on edge 23 and cable guide 17 assists in pulling the platform into the storage bay by taking some of the platform weight and allowing the spring and powered roller to draw the platform to the left.

Finally, it should be noted that in the absence of hydraulic or electric power the powered roller becomes freewheeling due to the action of the conventional internal clutch 52 described earlier. Under these conditions it is a relatively simple matter to deploy the platform by simply grasping edge 25 and pulling the platform out till edge 23 clears guide 17. The free fall edge 23 will be softened by spring mechanism 30. To stow the platform manually, edge 23 would need to be lifted (with an assist from spring mechanism 30) till supported by guide 17. Then edge 25 could be lifted and pushed till the platform is fully returned to the storage bay.

It is to be understood that the present invention is not limited to the sole embodiment described above, but encompasses any and all embodiments within the scope of the following claims.

I claim:

1. A wheeled land transport vehicle in combination with a deployable platform having a substantially planer bottom surface comprising;
    storage bay means attached to the underside of said vehicle for storing and carrying said platform in a securely stowed position beneath said vehicle during transport of said vehicle;
    power means for extending said platform for said stowed position to a fully deployed position with said planar bottom surface lying entirely below and beyond said storage bay means and flush upon the terrain adjacent said vehicle;
    said power means also being operable in a reverse mode for retracting said platform from said fully deployed position to said stowed position.

2. The combination of claim 1 wherein;
    said vehicle is a recreational vehicle;
    said platform is shaped as a substantially flat relatively thin rectangle so that, in said fully deployed position, an upper surface of said platform forms a patio suitable for sustained human occupancy regardless of surrounding terrain conditions; and said patio has totally unrestricted access from at least three sides of said rectangle.

3. The combination of claim 1 wherein;

said power means includes disengagement means enabling said platform to easily be manually extended and retracted in the event of failure of the power means.

4. The combination of claim 1 wherein;

said storage bay means includes roller means for supporting said platform in said stowed position and for providing relatively friction free movement of said platform to said fully deployed position.

5. The combination of claim 1, wherein;

said power means includes energy storage means operable to save gravitational potential energy lost during said extending of said platform and returning said energy during said retracting of said platform thus reducing the required capacity of said power means.

6. The combination of claim 1, wherein;

said power means includes control means operable so as to permit manual extending and retracting of said platform during an absence of power.

7. The combination of claim 6, wherein said power means further includes;

a reversible motor driven power roller which engages cable means which traverses a pulley mechanism and is attached to a single edge of said platform.

8. The combination of claim 2 wherein;

said power means includes disengagement means enabling said platform to easily be manually extended and retracted in the event of failure of the power means.

9. The combination of claim 2 wherein;

said storage bay means includes roller means for supporting said platform in said stowed position and for providing relatively friction free movement of said platform to said fully deployed position.

10. The combination of claim 2, wherein said power means includes energy storage means operable to save gravitational potential energy lost during said extending of said platform and returning said energy during said retracting of said platform thus reducing the required capacity of said power means.

11. The combination of claim 2, wherein;

said platform further includes a hinged plate which is folded flat against an upper surface of said platform when in said stowed position and swingable to a ramp position when in said deployed position to permit handicapped wheelchair access to said platform.

12. The combination of claim 11, further including;

fastening means for securing said hinged plate to said vehicle so as to secure said ramp in said storage bay when said vehicle is in transport.

13. The combination of claim 1, wherein;

said platform further includes a hinged plate which is folded flat against an upper surface of said platform when in said stowed position and swingable to a ramp position when in said deployed position to permit handicapped wheelchair access to said platform.

14. The combination of claim 13, further including;

fastening means for securing said hinged plate to said vehicle so as to secure said ramp in said storage bay when said vehicle is in transport.

15. A conversion kit for converting an existing recreational vehicle to a dwelling place with a patio comprising;

a deployable platform having a substantially planar bottom surface for forming said patio;

storage bay means attached to the underside of said vehicle for storing and carrying said platform in a securely stowed position beneath said vehicle during transport of said vehicle;

power means for extending said platform from said stowed position to a fully deployed position with said planar bottom surface lying entirely below and beyond said storage bay means and flush upon the terrain adjacent said vehicle;

said power means also being operable in a reverse mode for retracting said platform from said fully deployed position to said stowed position.

* * * * *